(12) United States Patent
Matsuoka

(10) Patent No.: US 6,838,846 B2
(45) Date of Patent: Jan. 4, 2005

(54) ELECTRIC POWER STEERING APPARATUS

(75) Inventor: Yuki Matsuoka, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/614,153

(22) Filed: Jul. 8, 2003

(65) Prior Publication Data

US 2004/0061465 A1 Apr. 1, 2004

(30) Foreign Application Priority Data

Jul. 9, 2002 (JP) ..................................... P.2002-199468

(51) Int. Cl.⁷ .............................................. H02P 7/00
(52) U.S. Cl. ...................... 318/432; 318/611; 318/632; 180/443; 180/446; 701/41; 701/43; 701/80
(58) Field of Search .................. 318/430–434, 318/611, 632; 180/443–446; 701/41, 43, 80

(56) References Cited

U.S. PATENT DOCUMENTS

| | | | |
|---|---|---|---|
| 5,881,836 A | | 3/1999 | Nishimoto et al. |
| 6,129,172 A | | 10/2000 | Yoshida et al. |
| 6,240,350 B1 | * | 5/2001 | Endo ........................... 701/41 |
| 6,459,971 B1 | * | 10/2002 | Kurishige et al. ............. 701/41 |
| 6,736,236 B2 | * | 5/2004 | Kurishige et al. .......... 180/446 |
| 6,768,283 B2 | * | 7/2004 | Tanaka et al. ............... 318/632 |
| 2001/0023382 A1 | * | 9/2001 | Kurishige et al. ............. 701/41 |
| 2001/0052756 A1 | * | 12/2001 | Noro et al. .................. 318/432 |
| 2002/0019690 A1 | * | 2/2002 | Kurishige et al. ............. 701/41 |
| 2002/0026270 A1 | * | 2/2002 | Kurishige et al. ............. 701/41 |
| 2002/0125063 A1 | * | 9/2002 | Kurishige et al. .......... 180/443 |
| 2003/0052639 A1 | * | 3/2003 | Tanaka et al. ............... 318/632 |
| 2003/0187558 A1 | * | 10/2003 | Zheng et al. ................. 701/41 |
| 2004/0079578 A1 | * | 4/2004 | Kurishige et al. .......... 180/446 |
| 2004/0140148 A1 | * | 7/2004 | Nishizaki et al. ........... 180/443 |

FOREIGN PATENT DOCUMENTS

| | | |
|---|---|---|
| EP | 1 170 196 A2 | 6/2001 |
| JP | 2000095132 A * | 4/2000 ............ B62D/6/00 |

* cited by examiner

*Primary Examiner*—Paul Ip
(74) *Attorney, Agent, or Firm*—McGinn & Gibb, PLLC

(57) ABSTRACT

An electric power steering apparatus for applying an assisting steering force to a steering mechanism of a vehicle by driving an electric motor according to a steering operation includes: an electric current command value calculation unit which calculates an electric current command value; a drive control unit which controls the drive of the electric motor based on the electric current command value; and a convergence control unit which determines a damping compensation value so that a quantity of steering operation is converged to a neutral point. The convergence control unit includes: a compensation electric current setting unit determines a basic damping compensation electric current value corresponding to the correction value of the target value, and a compensation electric current adjusting unit which adjusts the basic damping compensation electric current value based on the steering torque and the quantity of the steering operation, thereby calculating the damping compensation value.

3 Claims, 6 Drawing Sheets

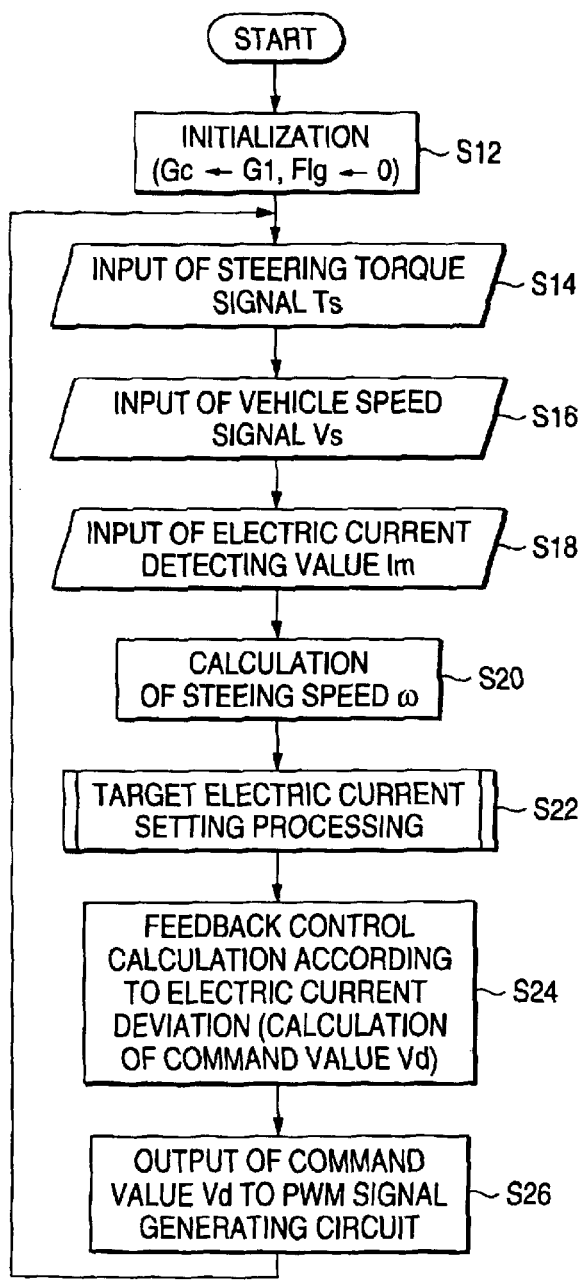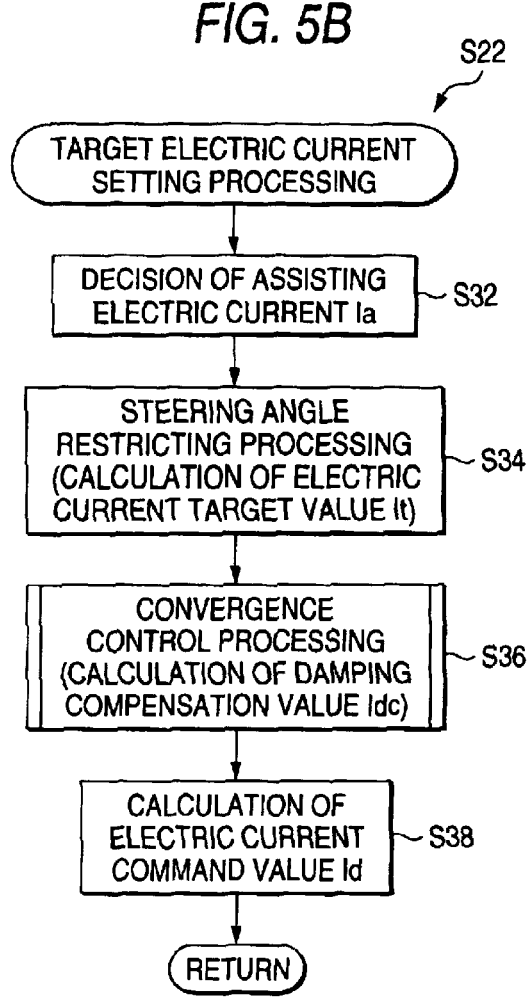

ELECTRIC POWER STEERING APPARATUS

BACKGROUND OF THE INVENTION

The present invention relates to an electric power steering apparatus for applying an assisting steering force to a steering mechanism of a vehicle by driving an electric motor according to the operation for steering the vehicle. More particularly, the present invention relates to a convergence control for returning a steering wheel to a neutral position in the electric power steering apparatus.

Conventionally, there is provided an electric power steering apparatus in which an assisting steering force is applied to a steering mechanism by driving an electric motor according to a steering torque given to a handle (steering wheel) by a driver. In this electric power steering apparatus, there is provided a torque sensor by which a steering torque given to the steering wheel (a steering unit) is detected. According to the steering torque detected by the torque sensor, an electric current command value is set as a target value of the electric current which is made to flow in the electric motor. According to the deviation between this electric current command value and the electric current value actually flowing in the electric motor, a voltage command value to be given to a drive unit of the electric motor is generated. For example, the drive unit for driving the electric motor includes: a PWM signal generation circuit for generating a pulse width modulation signal (PWM signal) of a duty ration according to the voltage command value; and a motor drive circuit composed of a power transistor which is turned on and off according to the duty ratio of the PWM signal. Voltage corresponding to the duty ratio, that is, voltage corresponding to the voltage command value is impressed upon the electric motor. An electric current flowing in the electric motor by this impression of voltage is detected by the electric current detector, and a difference between this detection value and the above electric current command value is used as deviation for generating the above voltage command value. As described above, in the electric power steering apparatus, feedback control is executed so that the target electric current (the electric current command value) which is set according to the steering torque can flow in the electric motor.

In the above electric power steering apparatus, convergence control is also executed for converging the steering wheel (a steering unit for steering the vehicle) to the neutral position. This convergence control is executed by correcting the target value of the motor current according to the steering speed and the running speed of the vehicle. In this case, the quantity of correction is referred to as "a convergence electric current value" or "a damping compensation electric current value". A specific method of this convergence control is described as follows. For example, a damping compensation electric current map, which is a table for giving a relation between the damping compensation electric current and the steering speed, is previously prepared, and a vehicle speed gain map, which is a table for giving a relation between the gain to be multiplied by the damping compensation electric current value and the vehicle speed, is previously prepared. According to these maps, the steering speed at each point of time and the damping compensation electric current value according to the vehicle speed are determined.

As described above, in the conventional convergence control, the damping compensation electric current is set according to the steering speed and the vehicle speed. Therefore, even when no convergence control is required, the motor current is corrected according to the damping compensation electric current. For example, when the steering wheel is quickly rotated, that is, in the case of a quick steering operation, a driver feels steering operation of the steering wheel heavy due to convergence control. In other words, the correction of a motor current in the case of convergence control corresponds to the generation of torque in a direction opposite to the rotating direction of the steering wheel. Therefore, convergence control affects a driver's feeling of steering.

SUMMARY OF THE INVENTION

It is an object of the present invention to provide an electric power steering apparatus in which a driver's feeling of steering is enhanced by preventing convergence control from affecting a driver's feeling of steering while an excellent convergence characteristic is being ensured.

In order to solve the aforesaid object; the invention is characterized by having the following arrangement. Aspect 1. An electric power steering apparatus for applying an assisting steering force to a steering mechanism of a vehicle by driving an electric motor according to a steering operation performed by a steering unit for steering the vehicle, comprising:

an electric current command value calculation unit which calculates an electric current command value by correcting a target value of an electric current to be made to flow in the electric motor;

a drive control unit which controls the drive of the electric motor so that an electric current of the electric current command value flows in the electric motor; and a convergence control unit which determines a damping compensation value, which is a correction value of the target value to be corrected by the electric current command value calculation unit, so that a quantity of steering operation performed by the steering unit is converged to a neutral point, the convergence control unit including:

a compensation electric current setting unit determines a basic camping compensation electric current value corresponding to the correction value of the target value based on a steering speed which is a changing speed of the quantity of the steering operation and a vehicle speed, and a compensation electric current adjusting unit which which adjusts the basic damping compensation electric current value based on the steering torque given to the steering unit and the quantity of the steering operation, thereby calculating the damping compensation value.

Aspect 2. The electric power steering apparatus according to the aspect 1, wherein the compensation electric current adjusting unit adjusts the basic damping compensation electric current value so that the damping compensation value is increased when the quantity of steering operation increases more than the neutral point and then decreases in a predetermined period of time and the steering torque is not higher than a predetermined value.

Aspect 3. The electric power steering apparatus according to the aspect 2, wherein the compensation electric current adjusting unit including:

a gain deciding unit which decides a gain with respect to the basic damping compensation electric current value based on the quantity of operation and the steering torque, and a multiplication unit which multiplies the basic damping compensation electric current value by the gain, thereby calculating the damping compensation value, and wherein the gain deciding unit increases the gain when the quantity of operation increases more than the neutral point and decreases and the steering torque is not higher than a predetermined value.

BRIEF DESCRIPTION OF THE DRAWINGS

FIGS. 5A and 5B are flow charts showing the motor control processing in the above embodiment.

DETAILED DESCRIPTION OF PREFERRED EMBODIMENTS

Referring to the accompanying drawings, embodiments of the present invention will be explained as follows.

1. Overall Constitution

Figure 1:
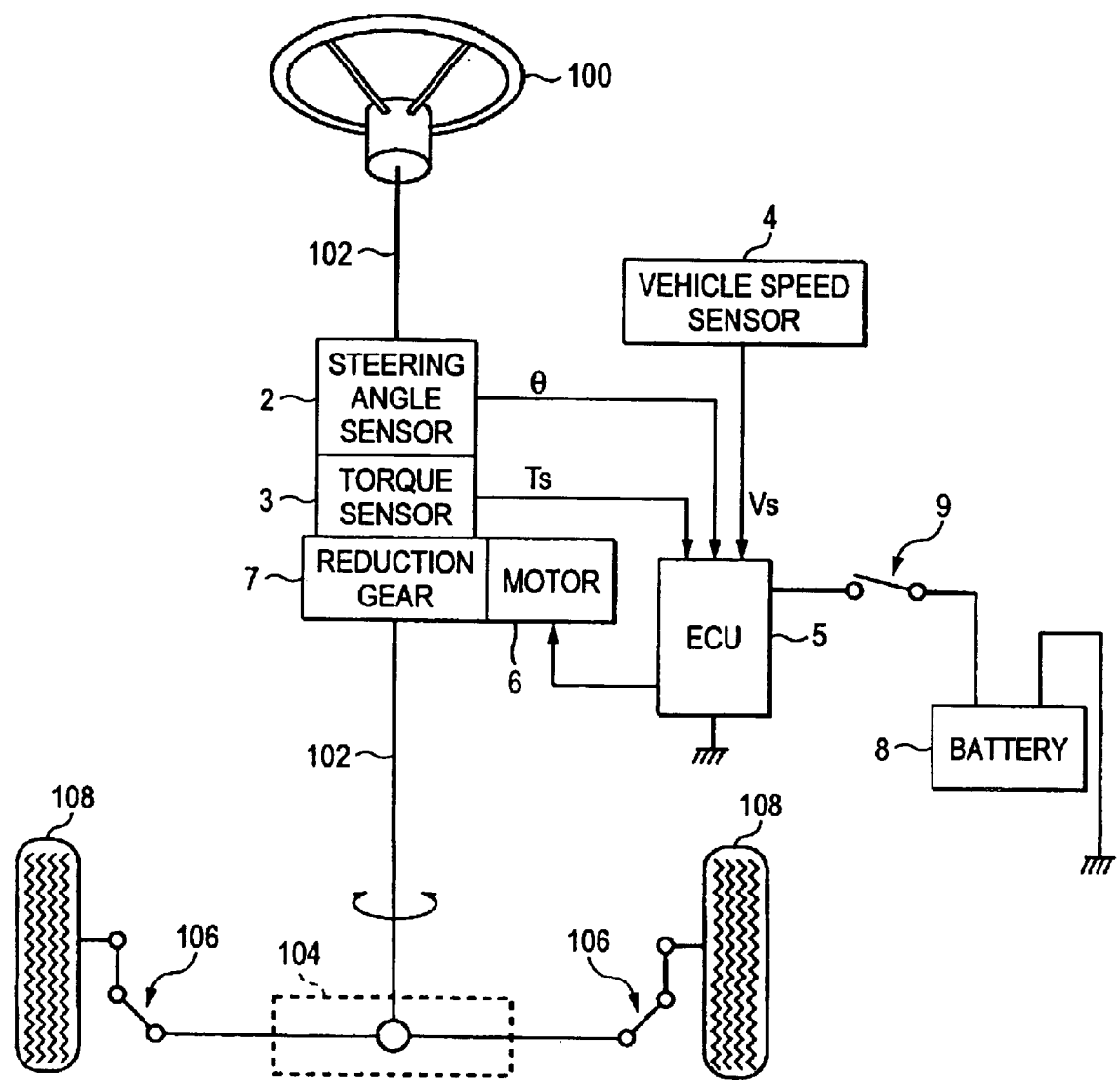
FIG. 1 is a schematic illustration showing the constitution of an electric power steering apparatus of an embodiment of the present invention together with the constitution of a vehicle.

FIG. 1 is a schematic illustration showing the constitution of an electric power steer apparatus according to the first embodiment of the present invention together with the constitution of a vehicle. This electric power steering apparatus includes: a steering shaft 102, one end of which is fixed to the handle (steering wheel) 100 (a steering unit); a rack pinion mechanism 104 connected with the other end of the steering shaft 102; a steering angle sensor 2 for detecting a steering angle of the steering wheel 100; a torque sensor 3 for detecting a steering torque given to the steering shaft 102 by the operation of the steering wheel 100; an electric motor 6 for generating an assisting steering force so as to reduce a load given to a driver when the steering wheel is operated; a reduction gear 7 for transmitting an assisting steering force generated by the motor 6 to the steering shaft 102; and an electronic control unit (ECU) 5 for controlling drive of the motor 6 according to the sensor signals sent from the steering angle sensor 2, the torque sensor 3 and the vehicle speed sensor 4. Electric power is supplied to the electronic control unit (ECU) 5 from the battery 8 mounted on the vehicle via the ignition switch 9. When a driver operates the steering wheel 100 in a vehicle on which the electric power steering apparatus is mounted, the steering torque given by the steering operation is detected by the torque sensor 3, and the electric motor 6 is driven by ECU 5 according to the steering torque detected by the steering torque sensor 3, the vehicle speed detected by the vehicle speed sensor 4 and the steering angle detected by the steering angle sensor 2. Due to the foregoing, the motor 6 generates an assisting steer force. When this assisting steering force is given to the steering shaft 102 via the reduction gear 7, a steering load given to the driver can be reduced. That is, a sum of the steering torque given by the steering operation, and the torque generated by the assisting steering force generated by the motor 6 is given to the rack pinion mechanism 104 via the steering shaft 102 as the output torque. When the pinion shaft is rotated by this output torque, the rotation is converted into a reciprocating motion of the rack shaft by the rack pinion mechanism 104. Both end portions of the rack shaft are connected with the wheels 108 via the connecting members 106 constituted by the tie rods and knuckle arms. Therefore, according to the reciprocating motion of the rack shaft, the directions of the wheels 108 can be changed.

2. Constitution of Control Unit

Figure 2:
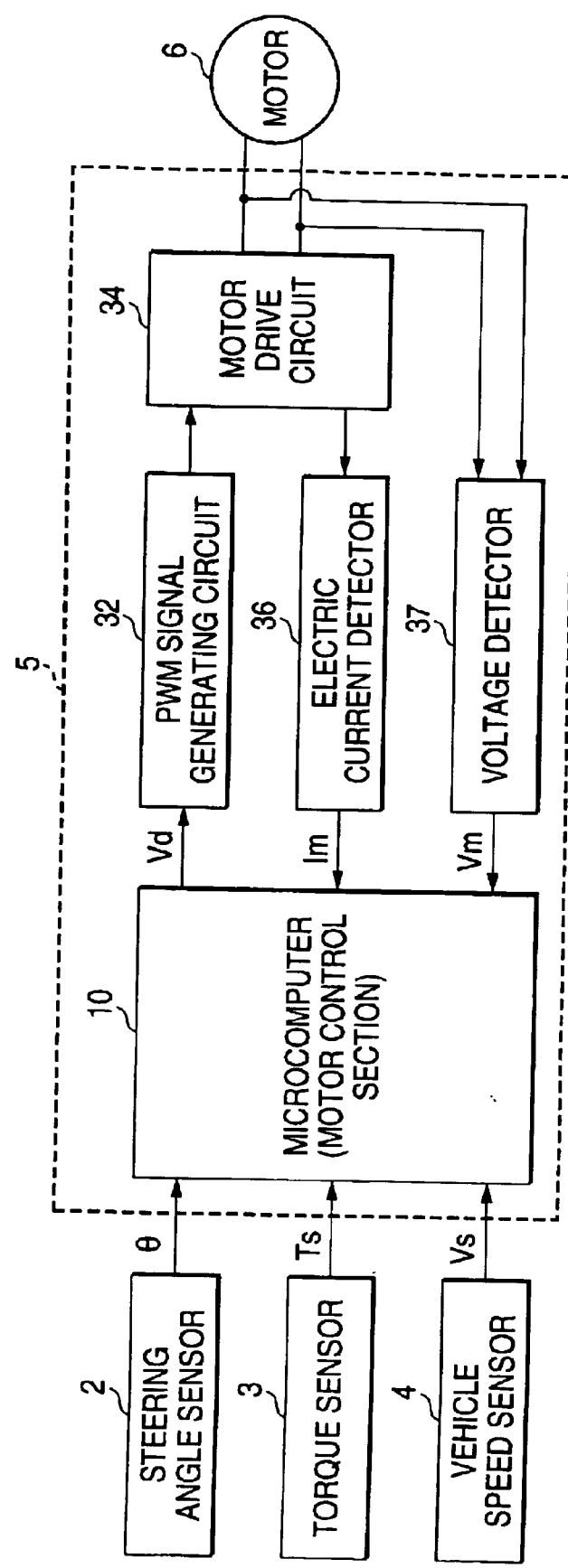
FIG. 2 is a block diagram showing a hardware constitution of ECU which is a control unit of the electric power steering apparatus of the above embodiment.

FIG. 2 is a block diagram showing a hardware constitution of ECU 5 functioning as a control unit of the above electric power steering apparatus. This ECU 5 includes: a microcomputer 10 in which the timer function is built; a PWM signal generating circuit 32; a motor drive circuit 34; an electric current detector 36; and a voltage detector 37. Into the microcomputer 10, the steering angle signal θ is inputted from the steering angle sensor 2, the steering torque signal Ts is inputted from the torque sensor 3, and the vehicle speed signal Vs is inputted from the vehicle speed sensor 4. In this ECU 5, the electric current detector 36 detects an electric current supplied to the motor 6, that is, the electric current detector 36 detects a motor current, and the detection result is outputted as the electric current detection value Im. The voltage detector 37 detects a voltage between the terminals of the motor 6, and the detection result is outputted as the voltage detection value Vm. The electric current detection value Im and the voltage detection value Vm are also inputted into the microcomputer 10. When the microcomputer 10 executes a program stored in the internal memory, it functions as a motor control section. The voltage command value Vd, which is a voltage value to be impressed upon the motor 6, is calculated so that the motor 6 can generate an appropriate assisting steering torque corresponding to the steering torque and the vehicle speed according to the steering angle signal θ, steering torque signal Ts, vehicle speed Vs, electric current detection value Im and voltage detection value Vm. The PWM signal generation circuit 32 generates a PWM signal, the duty ratio of which changes according to the voltage command value Vd and supplies the signal to the motor drive circuit 34. The motor drive circuit 34 is constituted by a plurality of power transistors as the switching elements. These switching elements are turned on and off in response to the PWM signal generated in the PWM signal generation circuit 32. Due to the foregoing, the motor drive circuit 34 generates a voltage according to the voltage command value Vd and impresses the voltage upon the motor 6.

Figure 3:
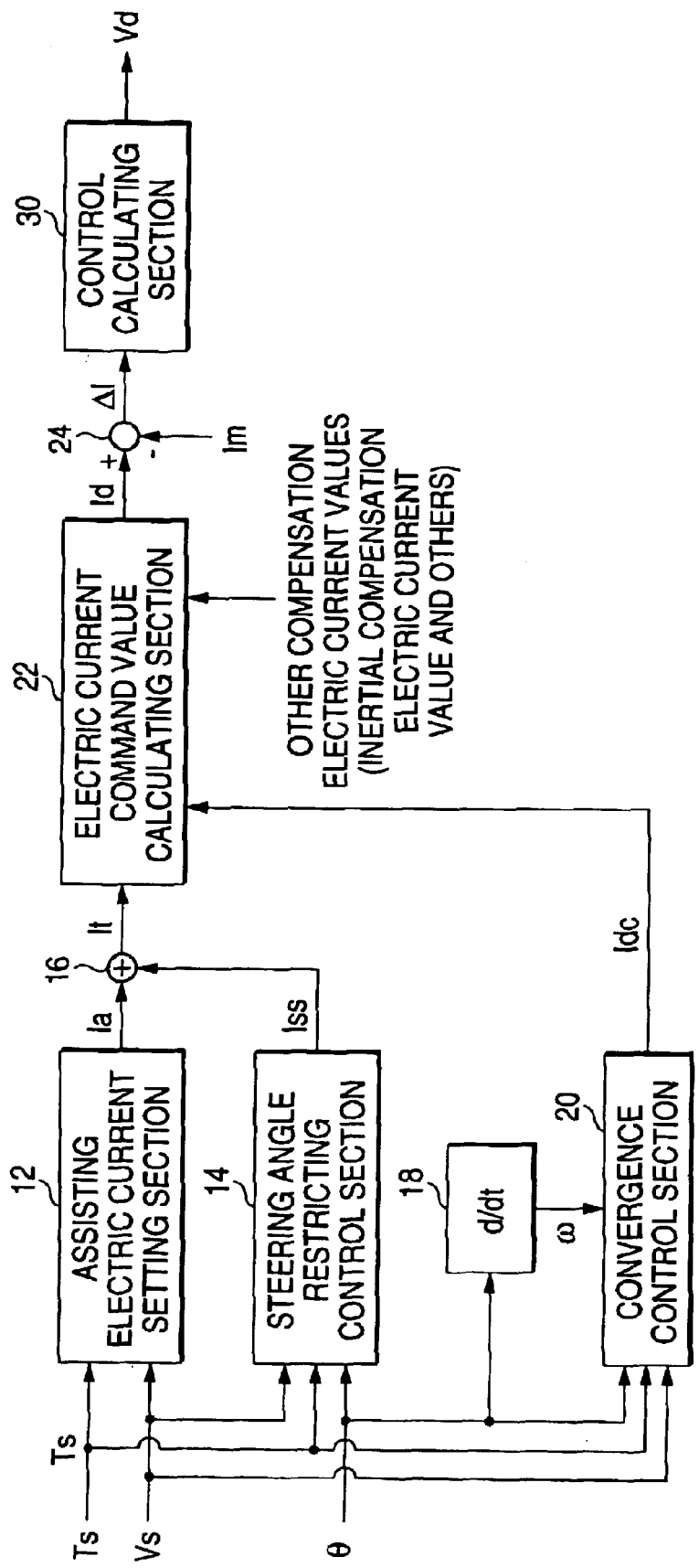
FIG. 3 is a block diagram showing a functional constitution of a motor control section of the electric power steering apparatus of the above embodiment.

FIG. 3 is a block diagram showing a functional constitution of the motor control section (microcomputer) 10 in the above ECU. This motor control section 10 includes: an assisting electric current setting section 12; a steering angle restricting control section 14; an adder 16; a differentiator 18; a convergence control section 20; an electric current command value calculating section 22; a subtracter 24; and a control calculating section 30. These components are realized by software when the microcomputer 10 executes a predetermined program.

In the above motor control section 10, the steering torque signal Ts outputted from the torque sensor 3 is inputted into the assisting electric current setting section 12, the steering angle restricting section 14 and the convergence control section 20. The vehicle speed signal Vs outputted from the vehicle speed sensor 4 is inputted into the assisting electric current setting section 12, the steering angle restricting section 14 and the convergence control section 20. The steering angle signal θ outputted from the steering angle sensor 2 is inputted into the steering angle restricting section 14, the differentiator 18 and the convergence control section 20. When the differentiator 18 conducts time-differentiation on the steering angle signal θ so as to calculate the steering speed ω, the steering speed ω is calculated. The thus obtained steering speed ω is inputted into the convergence control section 20.

The assisting electric current setting section 12 calculates the assisting electric current value Ia, which is an electric current value to be supplied to the motor 6 so as to generate an appropriate assisting steering force, according to the steering torque Ts and the vehicle speed signal Vs.

The steering angle restricting control section 14 calculates the steering angle restricting electric current value Tss as a quantity of correction with respect to the assisting electric current value Ia for preventing the steering wheel 100 from being excessively rotated in the case where a driver promptly operates the steering wheel 100 for the purpose of evading a collision with an obstacle on a road when the vehicle is running at a high speed. The steering angle restricting control section 14 determines a quantity of steering angle, which is an appropriate quantity of steering wheel operation (which will be referred to as "an appropriate quantity of steering angle"), according to the vehicle speed on the basis of the vehicle speed signal Vs. In the case where the actual quantity of steering angle of the steering wheel 100 exceeds an upper limit of the appropriate quantity of steering angle according to the steering angle signal θ, the steering angle restricting electric current value Iss is decided to correct the assisting electric current value Ia so that the assisting steering can be gradually reduced or the motor 6 can generate a steering force in the opposite direction to the steering direction.

When the steering angle restricting electric current value Iss decided above is added to the assisting electric current Ia by the adder 16, the electric current target value It, which is an assisting electric current after correction, can be obtained. This electric current target value It is inputted into the electric current command value calculating section 22.

The convergence control section 20 decides the damping compensation electric current value, which will be referred to as "a damping compensation value" hereinafter, as a quantity of correction (subtracted value) with respect to the electric current target value It so that the steering wheel 100 can be converged to the neutral position according to the steering speed ω, the vehicle speed signal Vs, the steering angle signal θ and the steering torque signal Ts. The convergence control section 20 in this embodiment decides the damping compensation value Idc for convergence control while consideration is given to not only the steering speed and the vehicle speed but also the steering angle and the steering torque. From this viewpoint, the convergence control of this embodiment is different from the conventional convergence control. The detail of the method of deciding the damping compensation value Idc will be described later.

The thus decided damping compensation value Idc is inputted into the electric current command value calculating section 22. The other compensation electric current values such as an inertia compensation electric current value is also calculated by the motor control section 10 and inputted into the electric current command value calculating section 22. The electric current command value calculating section 22 corrects the electric current target value It according to the damping compensation value Idc and the other compensation values and outputs the corrected electric current target value as the electric current command value Id.

The motor 6 is controlled as follows by the drive control unit constituted by the subtracter 24, control calculating section 30, PWM signal generating circuit 32, motor drive circuit 34 and electric current detector 36 according to this electric current command value Id.

The subtracter 24 calculates the deviation (ΔI=Id−Im) between the electric current command value Id (the electric current target value after correction) outputted from the electric current command value calculating section 22, and the electric current detection value Im outputted from the electric current detector 36 as an actual motor current. This deviation ΔI is inputted into the control calculating section 30. The control calculating section 30 calculates the voltage command value Vd by the control calculation (usually, proportional integral calculation) according to the above deviation ΔI=Id−Im. This voltage command value Vd is outputted from the microcomputer 10 which is a motor control section. The voltage command value Vd outputted from the microcomputer 10 is inputted into the PWM signal generation circuit 32. In the PWM signal generation circuit 32, the PWM signal, the duty ration of which is according to the voltage command value Vd, is generated. When the switching element in the motor drive circuit 34 is turned on and off by the PWM signal, a voltage according to the voltage command value Vd is generated, and this voltage is impressed upon the motor 6. An electric current flows in the motor 6 by this voltage impression, and the motor 6 generates a torque according to this electric current. At this time, the motor current is detected by the electric current detector 36, and the electric current detection value Im as the detection result is used for calculating the above deviation ΔI=Id−Im. In this way, feedback control is conducted so that an electric current, which is equal to the electric current command value (electric current target value after correction) Id calculated by motor control section (microcomputer 10), can flow in the motor 6.

3. Constitution of Convergence Control Section

Figure 4:
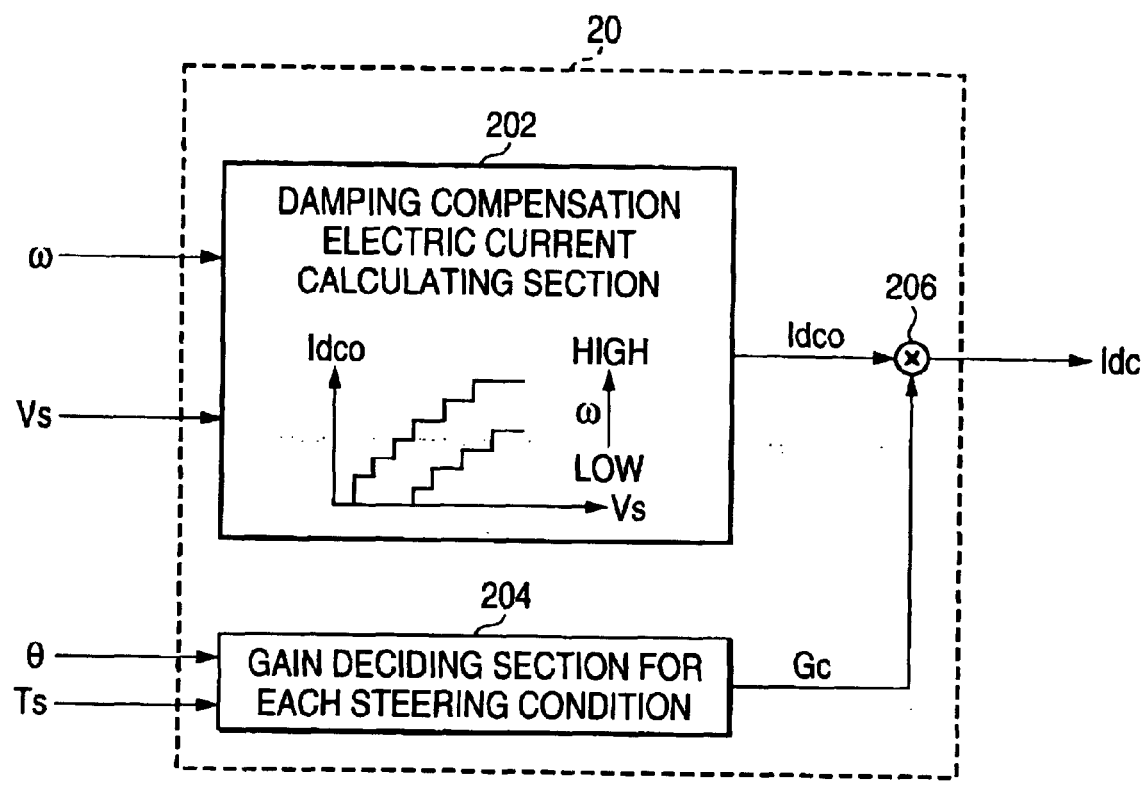
FIG. 4 is a block diagram showing a functional constitution of a convergence control section in the motor control section of the above embodiment.

FIG. 4 is a block diagram showing a constitution of the convergence control section 20 in the motor control section 10. This convergence control section 20 includes: a damping compensation electric current calculating section 202; a gain deciding section 204 for each steering condition; and an adder 206.

In the same manner as that of the conventional convergence control, the damping compensation electric current calculating section 202 decides a damping compensation electric current value according to the steering speed and the vehicle speed at each point of time on the basis of the steering speed ω and the vehicle speed signal Vs. This damping compensation electric current value is referred to as "a basic damping compensation electric current value" and represented by the mark "Idco" so that this damping compensation electric current value can be distinguished from the damping compensation value Idc outputted from the convergence control section 20.

The gain deciding section 204 for each steering condition decides the damping compensation electric current gain Gc according to the steering state on the basis of the steering angle signal θ and the steering torque signal Ts. The detail of the method of deciding this damping compensation electric current gain Gc will be described later.

The basic damping compensation electric current value Idco and the damping compensation electric current gain Gc decided as described above are inputted into the multiplier 206, and the multiplier 206 calculates the multiplied value Gc×Idco. This multiplied value Gc×Idco is outputted from the convergence control section 20 as the damping compensation value Idc and used for correcting the electric current target value It in the electric current command value calculating section 22 so as to find the electric current command value Id.

4. Motor Control Processing

In this embodiment, the motor control section having the above constitution is realized by software when the microcomputer 10 executes a predetermined program, that is, when the processing shown in FIGS. 5 and 6, which will be referred to as "motor control processing" hereinafter, is executed. This motor control processing will be explained as follows.

In this embodiment, when the ignition switch 9 is turned on, the microcomputer 10 is ECU 5 initializes a variable and flag used in the motor control processing as shown in FIG. 5A (step 12). In this initializing process, the first gain value G1 is set as the damping compensation electric current gain Gc, and the flag Flg used for detecting the specific steering state described later is reset (Flg=0). In this case, the first gain value G1 is a predetermined value to be set as the damping compensation electric current gain Gc in the case where the steering state is not a specific steering state. Therefore, the first gain value G1 is set so that the damping compensation electric current value Idc be lower than the conventional one. In this connection, the second gain value G2 described later is a predetermined value to be set as the damping compensation electric current gain Gc in the case where the steering state is a specific steering state. The second gain value G2 is set so that the damping compensation electric current value Idc be higher than the conventional one in the specific steering state.

Next, the microcomputer 10 receives the steering torque signal Ts from the torque sensor 3 and receives the vehicle speed signal Vs from the vehicle speed sensor 4 (step S14, S16). In the following explanations, the value of the thus received steering torque signal Ts is referred to as a steering torque detection value represented by the mark "Ts". The value of the thus received vehicle speed Vs is referred to as a vehicle speed detection value represented by the mark "Vs". Successively, the microcomputer 10 receives the electric current detection value Im from the electric current detector 36 (step S18). After that, when the microcomputer 10 conducts time-differential-calculus on the steering angle signal θ sent from the steering angle sensor 2, the steering speed ω is found (step S20).

Next, when the microcomputer 10 executes the target electric current setting processing shown in FIG. 5B, the electric current command value Id is calculated (step S22). In this target electric current setting processing, the microcomputer 10 operates as follows.

First, according to the steering torque detection value Ts and the vehicle speed detection value Vs, the assisting electric current value Ia is decided (step S32). Specifically, the assisting electric current value Ia is decided as follows. A table (referred to as "an assisting table"); on which a relation between the value of an assisting electric current to be supplied to the motor 6 for generating an appropriate assisting steering force and the steering torque is shown by using the vehicle speed as a parameter, is previously stored in the memory of the microcomputer 10, and the assisting electric current value Ia is decided by referring to this assisting table.

Next, the steering angle restricting processing is executed which is a processing for restricting a quantity of the steering angle so that a quantity of the steering angle of the steering wheel 100 (absolute value |θ| of the steering angle detection value θ) can be an appropriate value (step S34). In this steering angle restricting processing, first, an appropriate quantity of the steering angle is decided according to the vehicle speed detection value Vs. Next, it is judged whether or not the actual quantity |θ| of the steering angle of the steering wheel 100 exceeds the upper limit of the appropriate quantity of the steering angle. In the case where the actual quantity |θ| of the steering angle of the steering wheel 100 exceeds the upper limit of the appropriate quantity of the steering angle, the steering angle restricting electric current value Iss is decided to correct the assisting electric current value Ia so that the assisting steering force can be gradually decreased or a steering force in the opposite direction to the steering direction can be generated by the motor 6 according to the steering torque detection value Ts and the steering angle detection value θ. For example, by a map previously prepared, according to the vehicle speed and the steering angle, a quantity of decrease in the assisting steering force or the steering angle restricting electric current value Iss, which corresponds to a steering force in the opposite direction, is decided. When the steering angle restricting electric current value Iss is added to the assisting electric current value Ia described above, (the assisting electric current value Ia, which has been subjected to the steering angle restricting processing)+(Iss) is obtained as the electric current target value It.

When the assisting electric current Ia is corrected by the steering angle restricting processing as described above, it is possible to avoid the occurrence of a case in which a driver excessively rotates the steering wheel to cope with the external circumstances (for example, a driver excessively rotates the steering wheel to avoid a collision with an obstacle on a road). In this connection, in the steering angle restricting processing, the steering restricting electric current value Iss is calculated according to not only the steering angle detection value θ but also the steering torque detection value Ts. The reason is to prevent the steering operation, which is necessary for avoiding a collision with an obstacle, from being obstructed while an unnecessary increase in the quantity of the steering angle is being prevented. According, in the steering angle restricting processing, even when the actual quantity |θ| of the steering angle of the steering wheel 100 exceeds the upper limit of the appropriate quantity of the steering angle, in the case where the steering torque is not less than a predetermined value, the steering angle restricting electric current value Iss is calculated as a value, the absolute value of which is low. As a result, a quantity of the correction of the assisting electric current value Ia becomes low. Therefore, the vehicle can stably run at high speed without hurting the driver's good feeling of steering.

Figure 6A:
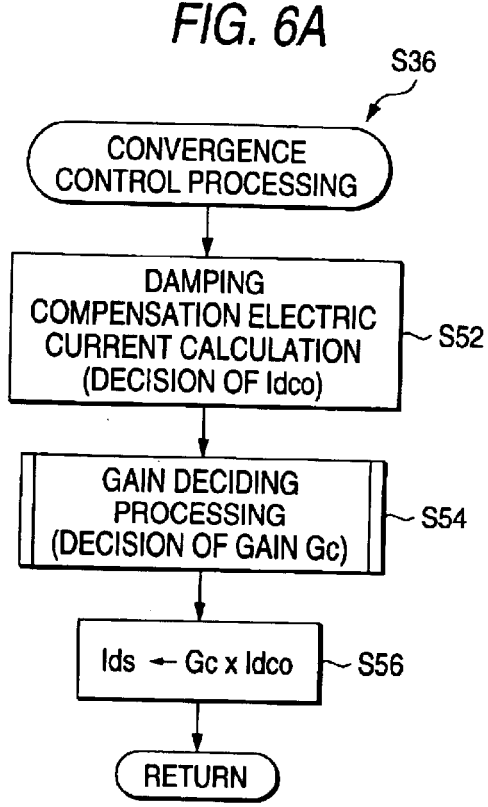
FIGS. 6A and 6B are flow charts showing convergence control processing included in the motor control processing in the above embodiment.

After the above steering angle restricting processing is completed, the convergence control processing is executed which is a processing for converging the quantity of the steering angle of the steering wheel 100 to the neutral point (step S36). In this case, at the neutral point; the quantity of the steering angle is usually θ corresponding to the straight running of the vehicle. FIG. 6A is a flow chart showing this convergence control processing.

In this convergence control processing, first, the basic damping compensation electric current value Idco is calculated by the same damping compensation electric current calculation as the conventional one (step S52). Specifically, a damping compensation electric current map, on which a relation between the vehicle speed and the basic damping compensation electric current value is shown by using the steering speed as a parameter, is previously stored in the memory built in the microcomputer 10, and when the map is referred, the basic damping compensation electric current value Idco corresponding to the steering speed ω, which is calculated in step S20, and also corresponding to the vehicle speed detection value Vs, which is inputted in step S16, may be decided. Instead of the above method, the following method may be adopted. A damping compensation electric current map, which gives a relation between the steering speed and the damping compensation electric current value, and a vehicle speed gain map, which gives a relation between the gain to be multiplied by the damping compensation electric current value and the vehicle speed, are previously stored in the memory built in the microcomputer 10. First, when the damping compensation electric current may is referred, a damping compensation electric current value according to the above steering speed ω is decided. Next, when the vehicle speed gain map is referred, a gain according to the vehicle speed detection value Vs is decided. When the damping compensation electric current value and the gain are multiplied to each other, the basic damping compensation electric current value Idco may be decided. In this connection, setting is conducted in such a manner that the basic damping compensation electric current value Idco is increased according to an increase in the vehicle speed Vs and also according to an increase in the steering speed ω.

After the basic damping compensation electric current value Idco has been decided as described above, next, the gain deciding processing for deciding the damping compensation electric current gain Gc to be multiplied by this basic damping compensation electric current value Idco is executed (step S54).

In this gain deciding processing, the quantity |θ| of steering angle is increased from the neutral point in the predetermined period of time Tm0 and then decreased. Further, a state in which the steering torque detection value Ts is not more than the predetermined value Ts0 is detected as a specific steering state. In this specific steering state, the damping compensation electric current gain Gc is set at the second gain value G2 which is a high value. In a normal steering state except for this specific steering state, the damping compensation electric current gain Gc is set at the first gain value G1 (G1<G2) which is a relatively low value. In this case, the above predetermined period of time Tm0 is a sufficiently short period of time compared with the period of time in which a driver (human) operates the steering wheel so that the quantity of steering angle can be increased from the neutral point and then decreased. For example, the above predetermined period of time Tm0 is approximately 500 msec to 1 sec. The above predetermined period of time is a value which is set at a reference value for judging whether or not the driver (human) operates the steering wheel 100 so as to steer the wheels 108.

Figure 6B:
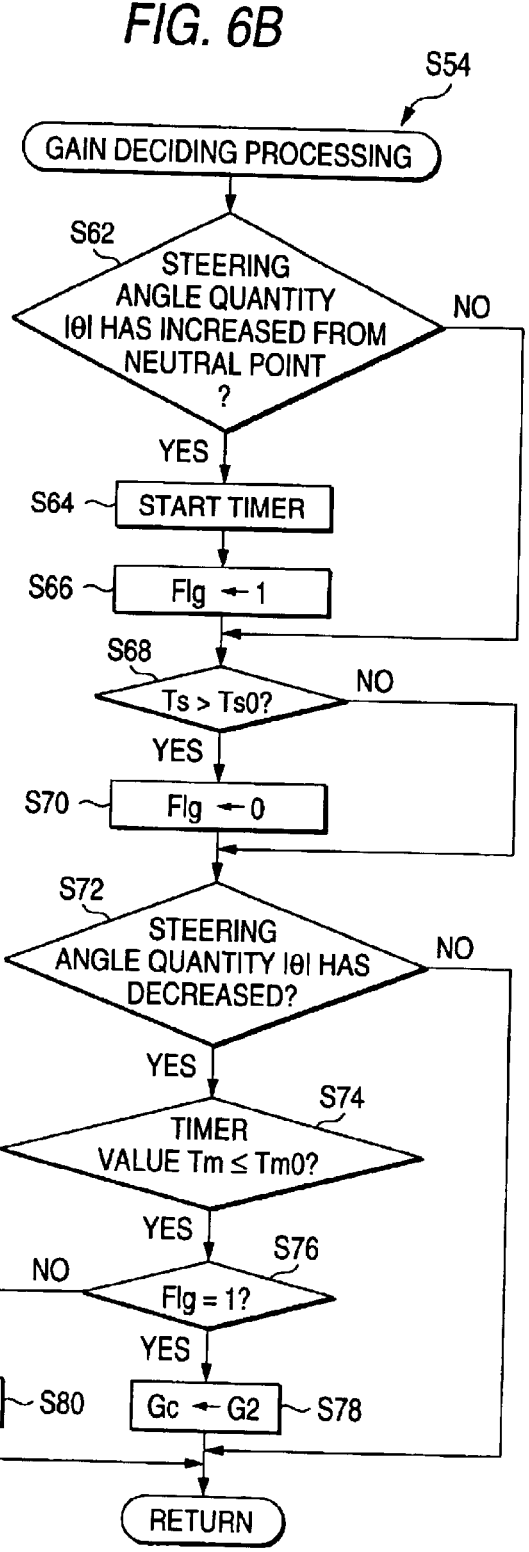

The above specific steering state corresponds to a state in which convergence control is required. For example, the above specific steering state corresponds to a state in which the steering wheel is suddenly returned when a wheel (tire) comes into a hole made on a road in the case of running at high speed. If convergence control is not sufficiently conducted in the above steering state, a change in the steering angle (steering motion) is extended and the vehicle may behave dangerously. In this embodiment, by the gain deciding processing in the specific steering state, compared with a normal steering state, the damping compensation electric current gain Gc becomes a sufficiently high value G2 (for example, a value 1.5 times as high as the first gain value G1). Due to the foregoing, convergence control can be sufficiently conducted. Referring to FIG. 6B, an example of the gain deciding processing will be explained below.

In the gain deciding processing shown in FIG. 6B, the microcomputer 10 operates as follows.

First, according to the steering angle detection value θ, it is judged whether or not the steering angle quantity |θ| is increased from the neutral point (step S62). In the case where the steering angle quantity |θ| is increased from the neutral point as a result of the judgment, the timer built in the microcomputer 10 is reset and then started (step S64). The flag Flg is set (Flg=1) (step S66). After that, the program proceeds to step S68. On the other hand, in the case where the steering angle quantity |θ| is not increased from the neutral point, the program proceeds to step S68 as it is.

In step S68, it is judged whether or not the steering torque detection value Ts is not more than the predetermined value Ts0. When Ts>Ts0 as a result of the judgment, the Flag Flg is reset to show that the steering wheel is operated by the driver (Flg=0), (step S70). After that, the program proceeds to step S72. When Ts<Ts0 as a result of the judgment, the program proceeds to step S72 as it is.

In step S72, according to the steering angle detection value θ, it is judged whether or not the steering angle quantity |θ| is decreased. In the case where the steering angle quantity |θ| is decreased as a result of the judgment, the program proceeds to step S74. In the case where the steering angle quantity |θ| is not decreased as a result of the judgment, the program returns to the routine of convergence control processing.

In step S74, it is judged whether or not the value Tm of the timer built in the microcomputer 10 is not more than the predetermined period of time Tm0. When Tm≦Tm0 as a result of the judgment, the program proceeds to step S76. When Tm>Tm0, the damping compensation electric current gain Gc is set at the first gain G1 (step S80), and the program returns to the convergence control processing routine.

In step S76, it is judged whether or not the flag Flg is set (Flg=1 or not). When the flag Flg is set (Flg=1) as a result of the judgment, that is, when the steering torque detection value Ts does not exceed the predetermined value Ts0 after the point of time of the latest start of the timer, the damping compensation electric current gain Gc is set at the second gain value G2 which is higher than the first gain value G1 (step S78), and the program returns to the convergence control processing routine. On the other hand, as a result of the judgment, when the flag Flg is reset (Flg=0), that is, in the case where the steering torque detection value Ts exceeds the predetermined value Ts0 after the point of time of the latest start of the timer, the damping compensation electric current gain Gc is set at the first gain value G1 (step S78), and the program returns to the convergence control processing routine.

When the program returns from the above gain deciding processing routine to the convergence control processing routine, when the basic damping compensation electric current value Idco is multiplied by the damping compensation electric current gain Gc at this point of time, the damping compensation value Idc is calculated (step S56 in FIG. 6A). After that, the program returns to the routine of the target electric current setting processing.

After the program has returned from the convergence control processing routine to the target electric current setting processing routine, when the electric current target value It is corrected according to the damping compensation value Idc, which is obtained by the convergence control processing, and also according to the other compensation electric current values, the electric current command value Id is calculated (step S38 in FIG. 5B). After that, the program returns to the main routine shown in FIG. 5A.

When the program returns from the target electric current setting processing routine to the main routine, the deviation ΔI=Id−Im between the electric current command value Id and the electric current detection value Im outputted from the electric current detector 36 is calculated, and the voltage command value Vd is calculated by the feedback control calculation (usually, proportional integral calculation) according to this deviation ΔI (step S24). Then, this voltage command value Vd is outputted from the microcomputer 10 which is a motor control section (step S26 in FIG. 5A). After that, the program returns to step S14. After that, the above steps S14 to S26 are repeated until the ignition switch 9 is turned off.

As can be understood from the motion (motor control processing) of the microcomputer 10, the convergence control section 20 (shown in FIG. 3) in the motor control section can be realized by the convergence control processing (shown by step S36 in FIG. 5B and FIG. 6A), and the gain deciding section 204 for each steering condition (shown in FIG. 4), which is a component of the convergence control section 20, can be realized by the gain deciding processing (step S54 in FIG. 6A and FIG. 6B).

5. Effect

According to the present embodiment described above, in the gain deciding processing, especially in the specific steering state in which the convergence control is required, that is, in a state in which the steering angle quantity |θ| is increased from the neutral point and then decreased in the predetermined period of time Tm0 and further the steering torque detection value Ts is not more than the predetermined value Ts0, the damping compensation electric current gain Gc is set at the second gain value G2 higher than the first gain value G1 (step S78 in FIG. 6B). On the other hand, in the normal steering state except for the above specific steering state, the damping compensation electric current gain Gc is set at the first gain value G1 which is a relatively low value (step S80). In the above specific steering state in which the convergence control is especially required according to the steering angle detection value θ and the steering torque detection value Ts, for example, in the case of a phenomenon in which the wheel 108 comes into a hole when the vehicle is running at high speed, and the steering wheel is promptly returned, the damping compensation electric current gain Gc is increased. Therefore, the convergence property of the steering wheel 100 to the neutral position is enhanced as compared with the convergence property of the conventional apparatus. On the other hand, in the normal steering state, an intensity of the damping compensation electric current gain Gc becomes lower than that of the conventional apparatus, so that the damping compensation value Idc can be suppressed. Therefore, a bad influence of the convergence control on the driver's feeling of steering can be avoided. Accordingly, it is possible to obtain a driver's good feeling of steering. In this connection, even in the normal steering state, although the damping compensation value Idc is lower than that of the conventional apparatus, the convergence control is executed. Therefore, for example, when the vehicle changes a lane while it is running at high speed, the vehicle behavior can be stabilized. As described above, according to the present embodiment, in the normal steering state, while the convergence control is being suppressed as compared with the conventional apparatus, the convergence control is sufficiently conducted when necessary. Accordingly, enhancement of the convergence property to the neutral position of the steering wheel and enhancement of a driver's feeling of steering can be simultaneously accomplished.

6. Variation

In the above embodiment, the steering angle quantity |θ| is increased from the neutral point and then decreased in the predetermined period of time Tm0; and further the state in which the steering torque detection value Ts is not more than the predetermined value Ts0 is detected as a specific steering state in which the convergence control is especially required, that is, the state is detected as a state in which the damping compensation electric current gain Gc should be set at a higher value G2 (shown in step S78 in FIG. 6B). However, as the detecting condition of this specific steering state, the condition that the steering angle quantity |θ| is not more than a predetermined value (fore example, |θ|≦45 degree) may be added. The detecting condition of detecting the specific steering state, in which the damping compensation electric current gain Gc is increased, is not limited to the above condition. As long as the condition is to detect a steering state, in which the convergence control is required with the wheel (tire) is twisted being affected by the state of a road, according to the steering torque detection value Ts and the steering angle detection value θ, any condition different from the condition of the above embodiment may be adopted.

In the above embodiment, when the steering angle signal θ inputted from the steering angle sensor 2 into the microcomputer 10 is differentiated, the steering speed ω corresponding to the actual steering speed is calculated (shown in FIG. 3). However, instead of that, the steering speed ω may be calculated according to the voltage detection value Vm (voltage between the terminals of the motor 6) inputted from the voltage detector 37. Further, instead of that, a sensor for detecting the rotating angle of the motor 6 may be provided, and the steering speed ω may be calculated according to a changing speed of the rotating angle.

What is claimed is:

1. An electric power steering apparatus for applying an assisting steering force to a steering mechanism of a vehicle by driving an electric motor according to a steering operation performed by a steering unit for steering the vehicle, comprising:

an electric current command value calculation unit which calculated an electric current command value by correcting a target value of an electric current to be made to flow in the electric motor;

a drive control unit which controls the drive of the electric motor so that an electric current of the electric current command value flows in the electric motor; and a convergence control unit which determines a damping compensation value, which is a correction value of the target value to be corrected by the electric current command value calculation unit, so that a quantity of steering operation performed by the steering unit is converged to a neutral point, the convergence control unit including:

a compensation electric current setting unit which determines a basic damping compensation electric current value corresponding to the correction value of the target value based on a steering speed which is a changing speed of the quantity of the steering operation and a vehicle speed, and a compensation electric current adjusting unit which adjusts the basic camping compensation electric current value based on the steering torque given to the steering unit and the quantity of the steering operation, thereby calculating the damping compensation value.

2. The electric power steering apparatus according to claim 1, wherein the compensation electric current adjusting unit adjusts the basic damping compensation electric current value so that the damping compensation value is increased wherein the quantity of steering operating increases more than the neutral point and then decreases in a predetermined period of time and the steering torque is not higher than a predetermined value.

3. The electric power steering apparatus according to claim 2, wherein the compensation electric current adjusting unit including:

a gain deciding unit which decides a gain with respect to the basic damping compensation electric current value based on the quantity of operation and the steering torque, and a multiplication unit which multiplies the basic damping compensation electric current value by the gain, thereby calculating the damping compensation value, and wherein the gain deciding unit increases the gain when the quantity of operation increases more that the neutral point and decreases in a predetermined period of time and the steering torque is not higher than a predetermined value.

* * * * *